(12) United States Patent
Merzenich

(10) Patent No.: US 7,379,550 B2
(45) Date of Patent: May 27, 2008

(54) METHOD FOR THE COMPUTER-ASSISTED PRODUCTION OF PUBLIC KEYS FOR ENCODING INFORMATION AND DEVICE FOR CARRYING OUT SAID METHOD

(75) Inventor: Klaus Merzenich, Pfungstadt (DE)

(73) Assignee: Deutsche Telekom AG, Bonn (DE)

( * ) Notice: Subject to any disclaimer, the term of this patent is extended or adjusted under 35 U.S.C. 154(b) by 861 days.

(21) Appl. No.: 10/472,355

(22) PCT Filed: Mar. 12, 2002

(86) PCT No.: PCT/DE02/00877

§ 371 (c)(1),
(2), (4) Date: Sep. 18, 2003

(87) PCT Pub. No.: WO02/078246

PCT Pub. Date: Oct. 3, 2002

(65) Prior Publication Data

US 2004/0096064 A1 May 20, 2004

(30) Foreign Application Priority Data

Mar. 22, 2001 (DE) .............................. 101 14 157

(51) Int. Cl.
*H04K 1/00* (2006.01)
*H04L 9/30* (2006.01)
*H04L 9/00* (2006.01)

(52) U.S. Cl. ......................................... 380/282; 380/30
(58) Field of Classification Search .................. 380/28, 380/30, 282
See application file for complete search history.

(56) References Cited

U.S. PATENT DOCUMENTS

| 5,142,578 | A | * | 8/1992 | Matyas et al. .............. 380/280 |
| 5,222,140 | A | * | 6/1993 | Beller et al. .................. 380/30 |
| 5,615,265 | A | | 3/1997 | Coutrot ....................... 380/20 |
| 5,638,445 | A | | 6/1997 | Spelman et al. .............. 380/21 |
| 6,230,269 | B1 | * | 5/2001 | Spies et al. ................. 713/182 |
| 6,754,820 | B1 | * | 6/2004 | Scheidt et al. .............. 713/166 |
| 6,970,562 | B2 | * | 11/2005 | Sandhu et al. ................ 380/30 |

(Continued)

FOREIGN PATENT DOCUMENTS

DE 19619125 5/1997

(Continued)

OTHER PUBLICATIONS

Chang et al., "A Strategy for Transforming Public-Key Cryptosystems into Identity-Based Cryptosystems," Proceedings of the 25th Annual IEEE International Carnahan Conference on Security Technology, pp. 68-72, 1991.*

(Continued)

*Primary Examiner*—Matthew Heneghan
(74) *Attorney, Agent, or Firm*—Darby & Darby

(57) ABSTRACT

A method for generating public keys for encrypting messages includes encrypting a message using a public key. The first message is capable of being decrypted using a private key associated with a recipient, the private key matching the public key. The public key includes a first and second part, the first part being the same for all recipients of the encrypted messages. The second part of the public key is determined using data that uniquely indicates the recipient.

14 Claims, 1 Drawing Sheet

U.S. PATENT DOCUMENTS 7,113,594 B2 * 9/2006 Boneh et al. ................. 380/28
2002/0153998 A1 * 10/2002 Litwin et al. .......... 340/310.01

FOREIGN PATENT DOCUMENTS

DE        19956819    5/2000
GB        2344163     5/2000

OTHER PUBLICATIONS

Adi Shamir "Identity-Based Cryptosystems and Signature Schemes" Lecture Notes in Computer Science, 1985, pp. 47-53.

Chang et al. "A Strategy for Transforming Public-Key Cryptosystems into Identity-Based Cryptosystems" Institute of Computer Science and Information Engineering, 1991, pp. 68-72.

C. C. Chang et al., "A Strategy for Transforming Public-Key Cryptosystems into Identity-Based Cryptosystems", 25th Annual 1991 IEEE International Carnahan Conference on Security Technology, Oct. 1991, pp. 68-72.

Yuh-Min Tseng et al. "ID-based Cryptographic Schemes Using a Non-Interactive Public-Key Distribution System", 14th Annual Computer Security Applications Conference, 1998, pp. 237-243.

E. Okamoto et al., "Key Distribution System Based on Identification Information", IEEE Journal on Selected Areas in Communication, vol. 7, May 1989, pp. 481-485.

L. Harn et al., "ID-Based Cryptographic Schemes for User Identification, Digital Signature, and Key Distribution", IEEE Journal on Selected Areas in Communications, vol. 11, Jun. 1993, pp. 757-760.

* cited by examiner

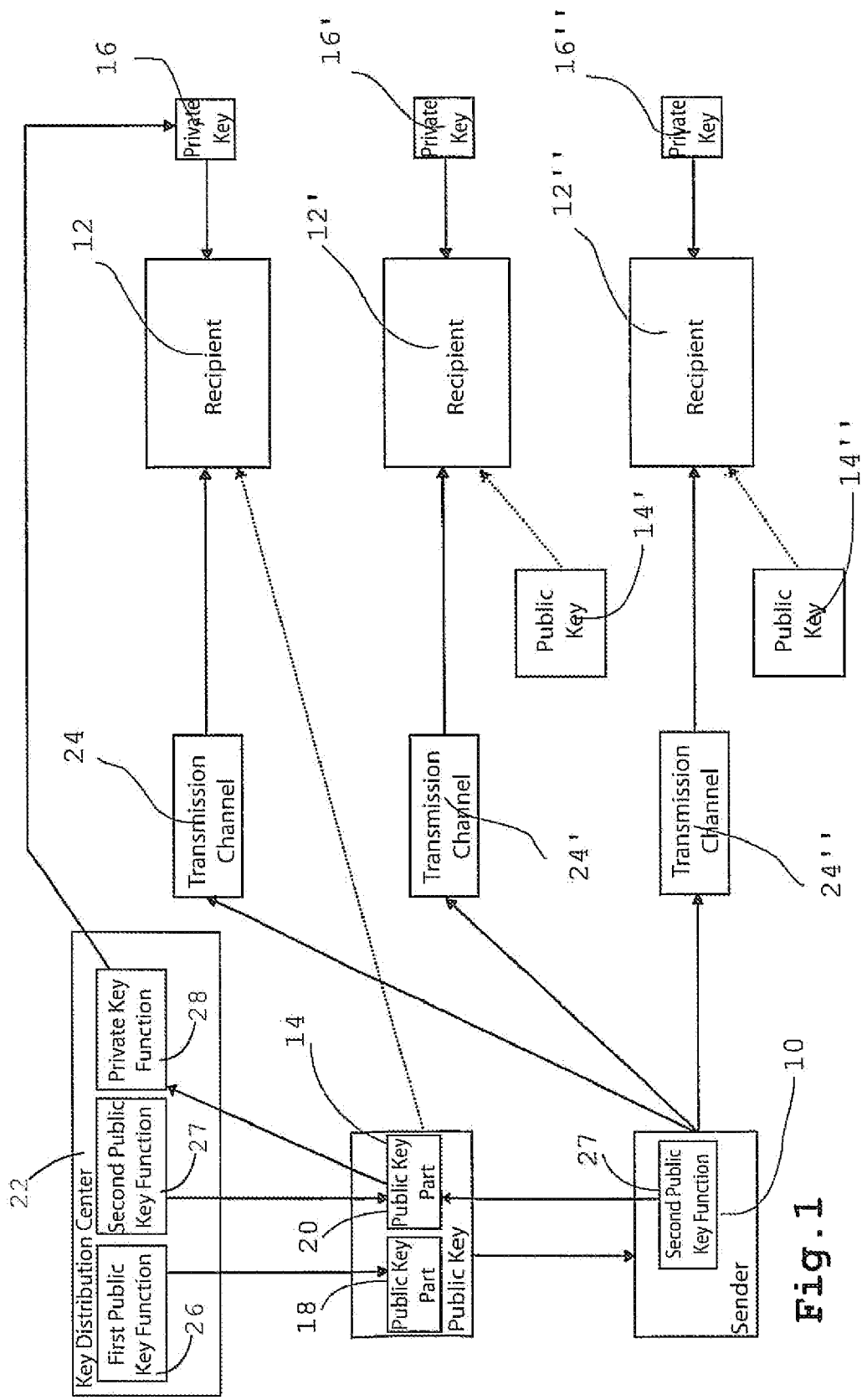

METHOD FOR THE COMPUTER-ASSISTED PRODUCTION OF PUBLIC KEYS FOR ENCODING INFORMATION AND DEVICE FOR CARRYING OUT SAID METHOD

CROSS-REFERENCE TO RELATED APPLICATIONS

This application is a U.S. National Stage Application under 35 U.S.C, §371 of PCT International Application No. PCT/DE02/00877, filed Mar. 12, 2002, which claims priority to German Patent Application No. DE 101 141 57.2, filed Mar. 22, 2001.

The present invention relates generally to a method for computer-aided generation of public keys for encrypting messages, and particularly to a method in which a second part of a public key is calculated using data that uniquely indicates a recipient.

BACKGROUND

Methods of asymmetric cryptography allow information to be very securely encrypted. A user has a public and a private key. Usually, the private key is known only to the user, whereas the public key is made public like a telephone number and used by third parties to encrypt messages to the user. Usually, publication is done either by the user himself/herself or by key distribution centers, so-called "trusted third parties" (TTP) or "Trust Centers". Such methods are also known by the name of public key methods.

In order to encrypt a message, a sender uses the public key which is assigned to a user or recipient and which the sender can load from a key distribution center, for example, over the Internet. The message encrypted in this manner can then be decrypted only by a person who possesses the private key matching the public key of the recipient.

One of the best-known asymmetric cryptographic methods is the RSA method, which is named by its inventors Rivest, Shamir and Adleman. The high security of the RSA method is based on the difficulty of the factoring problem: it is, in fact, easy to find and multiply together two large prime numbers (this product is called RSA number), but it is virtually impossible to find the prime factors if only the RSA number is known.

A public key öS generated using the RSA method is composed of two parts (öS1, öS2). The first part öS1 of a public key is the RSA number. The second part öS2 is a random number which must be relatively prime to (a-1)(b-1), if a, b are the two prime numbers mentioned. A private key pS matching the public key öS is calculated by the following equation: $pS*öS2=1 \mod ((a-1)(b-1))$. Calculation of private key pS from public key öS is similarly difficult and involved as the above-mentioned decomposition of a product into its prime factors. Because of this, a private key can be calculated from the associated public key only with great computational effort.

For encryption, the RSA method uses the following formula: $c=m^{öS2} \mod öS1$, where m is a plaintext message and c is the encrypted message. Decryption is done using the formula: $m=c^{pS} \mod öS1$. RSA number öS1 is used in both formulas.

Despite the very high security standards of the RSA method, this method, like all other methods of asymmetric cryptography, has the disadvantage that a sender who wishes to encrypt a message to a recipient must either already know the public key or request it from a key distribution center.

For example, in the known, now widespread program PGP (Pretty Good Privacy), which is based on RSA, public keys are distributed through special Internet sites. A sender can obtain the public key of a recipient from such an Internet site via the Internet, provided that the public key has been escrowed there by the recipient. The transfer of a public key can also accomplished via e-mail or using electronic data carriers such as diskettes.

However, such ways of transferring a public key hold essentially two disadvantages: If the key distribution center fails, it is impossible for the sender to load the public key of the recipient. For example, a server failure in the key distribution center could considerably affect the distribution of public keys. Similar is true for the transfer via e-mail. If an e-mail server fails, no more public keys can be transferred here either.

A further disadvantage, which occurs especially when obtaining public keys via the Internet, is that there is no absolute certainty about the authenticity of the key distribution center. In particular, there is no guarantee that the public keys distributed by the key distribution center are actually assigned to the specified recipients. For instance, it would be conceivable that, after a request for a public key via the Internet, an untrustworthy Internet site pretends to be a key distribution center and transmits an false public key, faking a particular recipient. When transferring a public key via e-mail, misuse is also possible through manipulation.

To circumvent this problem, A. Shamir proposed in his essay "Identity-Based crypto Systems and Signature Schemes", Crypto 1984, LNCS 196, Springer-Verlag, 47-53, 1985, that unique data identifying a recipient be used as the public key instead of generating public and private keys and publishing the public key. The examples given by A. Shamir for this unique data include the recipient name, the network address of his/her computer, his/her social security number, his/her address, office number or telephone number, or a combination of such data. The only condition is that the data uniquely identifies the recipient.

In order to send an encrypted message to a recipient, a sender must sign the message with his/her own private key; the signed message being encrypted using data uniquely identifying the recipient, such as his/her name and the network address of his/her computer. The recipient decrypts the received message using his/her own private key and verifies the signature of the sender using the name and the network address of the computer of the sender as a verification key. Here, the risk of misuse is lower than with pure public key systems, since the identification data of the sender and recipient provides at least some degree of confidentiality.

However, to implement the method proposed by A. Shamir, a central authority must generate the private keys for each user. Therefore, to prevent misuse, A Shamir proposes to distribute so-called "smart cards" to the users, the smart cards containing the particular private key of a user. Thus, unlike the encryption methods mentioned at the outset, the generation of keys does not lie in the hands of the user, but is carried out by a central authority. However, this involves an enormous administrative effort. Moreover, the central authority cannot be simply designed as an Internet site only for distributing public keys, but has to centrally generate keys for users and transmit the keys to these users. In the case of the smart card concept, this proposal is also extremely cost-intensive. It is also questionable whether such a smart card would be widely accepted because a not inconsiderable investment in equipment for reading the smart card would be required at the user end.

SUMMARY OF THE INVENTION

Therefore, an object of the present invention is to provide a method for computer-aided generation of public keys for encrypting messages in such a manner that a reliable and secure distribution of public keys is ensured, avoiding the described disadvantages, the intention being to keep the technical effort required for this within limits.

The present invention provides a method for generating public keys for encrypting messages. The method includes:
encrypting a first message using a public key, the first message being decryptable using a first private key associated with a first recipient, the first private key matching the public key, the public key including a first and second part, the first part being the same for all recipients of the encrypted messages; and
determining the second part of the public key using data that uniquely indicates the first recipient.

The present invention uses the discovery that the disadvantages mentioned at the outset can be overcome in that a public key for encrypting a message to a recipient is able to be, at least partially, calculated taking into account data that uniquely indicates or identifies the recipient.

This method offers at least two advantage: first all, it is very reliable and offers high functional security because in order to encrypt a message to the recipient, the sender can encrypt this message using a public key he/she has partially calculated or generated himself/herself. Therefore, it is no longer necessary to load the public key as often as in conventional public key systems. Secondly, the risk that a public key is forged is reduced because the sender at least partially participates in the generation of the public key and, in doing so, must know certain data that indicates or identifies the recipient.

Therefore, according to the present invention, a public key of a recipient includes two parts. A first part of the public key is the same for all recipients of an encrypted message. A second part of the public key is calculated taking into account data about the recipient. The first part of the public key can be published in any desired way, for example, using electronic storage media such as diskettes, CD ROMs, or also in printed form. The first part is shorter than the complete public key and therefore requires less time for transmission, for example, over the Internet. Moreover, less memory resources are required for storing the first part of the public key, in particular, at the sender end or in a key distribution center.

Preferably, the first part of the public key is published, i.e., made available, by at least one key distribution center. On the Internet, this at least one key distribution center can be, for example, an Internet site. In order to achieve high resistance to failure, the key distribution center can be designed as an Internet site that is particularly failsafe and reliable.

Based on the known RSA method, which has proven to be particularly secure and reliable for encryption, in a preferred embodiment of the method, the first part of the public key is calculated as the product of two prime numbers that are known only to the key distribution center. These two prime numbers are also used by the key distribution center to generate the private key assigned to the recipient. In this context, it is important that the prime numbers used to generate the private key and the first part of the public key be kept secret and known only to the key distribution center.

In order to ensure a particularly high level of authenticity of the method, the second part of the key, which is calculated by the sender himself/herself, should be uniquely assigned to the recipient. Preferably, this is ensured in that a telephone number, address, e-mail address associated with the recipient, his/her name and his/her date of birth and/or similar individual data of the recipient are used in the calculation of the second part of the public key. This individual data must be known to the sender who calculates the second part of the public key. For example, this data can be exchanged verbally between the sender and the recipient, which provides a particularly high level of security. If there is no need for such a high level of security, this individual data can also be published by the recipient, for example, via his/her own homepage, or be looked up by the sender in a public directory, for example, in a phone book.

A function for calculating the second part of the public key should preferably meet the following conditions, which are true for the RSA algorithm at least in a similar way:

öS2<(a-1) (b-1)

öS2 is relatively prime to (a-1) (b-1).

Here, the second part of the public key is denoted by öS2, and the two prime numbers as a, b. The function for calculating the second part of the public key can be defined in an arbitrary way. It only has to meet the above-mentioned conditions in order to provide the method according to the present invention with a level of security comparable to that of RSA. Since the two prime numbers a, b are kept secret by the key distribution center, the function should be able to calculate the second part of the public key, meeting the above-mentioned conditions, but without knowing the two prime numbers.

Both the sender and the key distribution center should use the same function to calculate the second part of the public key and the private key of a recipient. Preferably, this function is implemented using a calculation program and passed on to all users of the system in order that each sender uses the same calculation function as the key distribution center and that the second parts of the second parts of the public keys calculated by the senders match the corresponding private keys of the recipients.

In a currently preferred embodiment of the method, the first part of the public key is not dividable by 3. A hash value is calculated from an address of the recipient. The length of this hash value is such that 3 raised to the power of the greatest possible hash value is smaller than half the first part of the public key. The address cannot be "calculated back" from the hash value. Then, the second part of the public key is calculated by raising 3 to the power of the calculated hash value. This has turned out to be a good compromise between security and computational effort.

The present invention also provides a device for generating public keys for encrypting messages. The device includes:
a key distribution center, the key distribution center being configured to make available a first part of a first public key for download;
a first calculating unit configured to calculate the first part of the first public key and to calculate, using data identifying a first recipient, a first private key associated with the first recipient;
a second calculating unit configured to calculate, using the data identifying the first recipient, a second part of the first public key, the first public key being associated with the first recipient;
an encoding unit configured to encode a first message using the first public key; and
a decoding unit configured to decode the encoded first message using the first private key.

An inventive device for carrying out the method includes
an Internet site as a key distribution center including a network interface that makes available a first part of all public keys for download,
means for calculating the first part of all public keys and private keys assigned to recipients, taking into account data identifying the recipients,
means for calculating a second part of a public key assigned to a recipient, taking into a account data identifying the recipient,
means for encoding a message using a public key, and
means for decoding an encrypted message using a private key.

Preferably, the means for calculating the first part of all public keys, the means for calculating a second part of a public key assigned to a recipient, the means for encoding a message, and the means for decoding an encrypted message are designed as programs on computer-readable media having stored thereon respective program steps to be processed on a computer, in particular, a personal computer. For example, the means for calculating a second part of a public key assigned to a recipient, the means for encoding a message, and the means for decoding an encrypted message can be combined in a software package that is available to both the sender and the recipient of messages encrypted using the method according to the present invention. This software package can be designed for use under operating systems such as MS-DOS or MS-Windows 3.1, 95, 98, Me, NT, 2000, trademarked by the Microsoft company, Mac-OS trademarked by of the Apple company, or the trademarked free operating system Linux.

BRIEF DESCRIPTION OF THE DRAWING

In the following, the present invention will be explained in greater detail in the light of the exemplary embodiment shown in the drawing. The terms and associated reference numerals used in the list of reference numerals given at the back are used in the description, in the patent claims, in the abstract, and in the drawing.

In the drawing,

FIG. 1 is a schematic representation of the method according to the present invention.

DETAILED DESCRIPTION

FIG. 1 schematically shows how a sender 10 can transmit encrypted messages over transmission channels 24, 24' and 24" to a recipient 12, 12' and 12", using the method according to the present invention.

Each of recipients 12, 12', 12" is assigned a private key 16, 16', 16" and a public key 14, 14', 14". In this respect, the method is similar to the known public key method. A typical transmission channel to be mentioned here is the Internet over which the messages are transmitted as encrypted e-mails.

Private keys 16, 16', 16" were generated by a key distribution center 22 and made available to recipients 12, 12', 12". When generating the private keys, data was used that uniquely indicates or identifies the specific recipients, such as the address of a recipient. In mathematical terms, the private keys is calculated as follows: pS=f {address, a, b}, with a and b being two prime numbers that are known only to key distribution center 22. To calculate private keys 16, 16', 16", key distribution center 22 includes a calculation function 28 which implements the aforementioned function f.

Moreover, key distribution center 22 makes available a first part 18 for public keys 14, 14' and 14" that are assigned to the respective recipients 12, 12' or 12". First pad 18 is generated using a calculation function 26 and is the same for all public keys 14, 14' and 14". in order to send an encrypted message, a sender generates the second pad of the public key himself/herself, namely using the data uniquely identifying a recipient, such as the address mentioned. The data uniquely identifying a recipient must match the data that was used when generating private keys 16, 16' and 16".

In the present case, sender 10 generates second part 20 of public key 14 to be able to send an encrypted message to recipient 12. Second part 20 is calculated by calculation function 27; which is the same function as calculation functions 26, 27 of key distribution center 22. Calculation functions 26, 27 are also the same as calculation function 28. However, sender 10 does not know the two prime numbers a and b that are known to key distribution center 22 for generating first part 18 for public keys 14, 14' and 14" and for the creation of the private keys 16, 16', and 16". In terms of a formula, the resulting rule for calculating second part öS2 of a public key is expressed as öS2=f{address}.

The following is a brief explanation of the generation and transmission of an encrypted message from sender 10 to recipient 12:

Sender 10 gets first part 18 (öS1) of all public keys 14, 14', 14" from key distribution center 22, unless he/she already possesses this part 18. To this end, sender 10 downloads first part 18 over the Internet from the Internet site of the key distribution center. This can be done using the Secure Sockets Layer (SSL) protocol to ensure secure transmission over the Internet. SSL makes sure that the connection between sender 10 and key distribution center 22 is authentic, that is, that no Internet site other than the addressed Internet site of key distribution center 22 is able to enter into the connection. To this end, a certificate digitally signed by a certificate authority is sent by key distribution center 22 while establishing the connection with sender 10. Sender 10 can be sure that he/she is in contact with the real key distribution center 22 if he/she trusts this certificate.

After downloading first part 18 of all public keys 14, 14' and 14", sender 10 himself/herself generates second part 20 (öS2) of public key 14 for recipient 19, For this purpose, he/she uses the same calculation function 27 utilized by the key distribution center 22 and specifies the address of recipient 12 which is known to him/her and which was also used to generate public key 16 of the recipient. Second part 20 of public key 14 is now generated using calculation function 27 and the address of recipient 12. Second part 90 as it were, "individualizes" public key 14 for recipient 12.

Now, sender 10 possesses the complete public key 14 (öS=(öS1, öS2)) and is able to encrypt the message to recipient 12 and send it to him/her. Recipient 12 decrypts the received message using his/her private key 16. During decryption, the data that is individually assigned to recipient 12, i.e. his/her address, is checked for equivalence.

It is a feature of the present invention that a public key for encrypting a message to a recipient is, at least partially, calculated taking into account data indicating the recipient. The calculation can be carried out, for example, by a sender who knows the data. This reduces the risk of manipulation of public keys. In addition, the method is relatively insensitive to failure of key distribution centers and requires little resources because the first part of each public key generated using the method according to the present invention is the same for all public keys. Therefore, it is sufficient to load the first part once to enable a sender to encrypt messages to arbitrary recipients using the method according to the present invention.

LIST OF REFERENCE NUMERALS 10 sender
12 recipient
12' recipient
12" recipient
14 public key
14' public key
14" public key
16 private key
16' private key
16" private key
18 first part of the public key
20 second part of the public key
22 key distribution center
24 transmission channel
24' transmission channel
24" transmission channel
26 calculation function for first part of the public key
27 calculation function for the second part of the public key
28 calculation function for the private key

What is claimed is:

1. A method for generating public keys for encrypting messages, the method comprising:
encrypting a first message using a public key, the first message being decryptable using a first private key which has been generated using a data that uniquely indicates a first recipient, the first private key matching the public key, the public key including a first and second part, the first part being the same for all recipients of the encrypted messages;
and
determining the second part of the public key using the data that uniquely indicates the first recipient.

2. The method as recited in claim 1 further comprising generating and making available the first part of the public key and respective private keys of the recipients using a key distribution center.

3. The method as recited in claim 2 wherein the generating the first part of the public key is performed by calculating a product of two prime numbers that are known only to the key distribution center.

4. The method as recited in claim 1 wherein the determining the second part of the public key is performed using at least one of a telephone number, an address, an e-mail address, a name and a date of birth of the first recipient.

5. The method as recited in claim 4 wherein determining the second part of the public key is performed using a function, the following conditions being met:
öS2<(a−1) (b−1) and
öS2 is relatively prime to (a−1) (b−1),
wherein the second part of the public key is represented by öS2 and a and b each represent a respective prime number.

6. The method as recited in claim 1 further comprising determining the first private key using a calculation function, and wherein the determining the second part of the public key is performed using the calculation function.

7. The method as recited in claim 1 wherein the first part of the public key is not dividable by 3, and wherein the determining the second part of the public key is performed by calculating a hash value from the identifier of the first recipient, and by raising 3 to the power of the calculated hash value.

8. The method as recited in claim 7 wherein the hash value has a length so that a greatest possible hash value is smaller than half the first part of the public key.

9. A system for generating public keys for encrypting messages, the system comprising:
a key distribution center including a network interface, the key distribution center being configured to make available a first part of a public key for download, the first part of the public key being the same for all public keys;
a first calculating unit configured to calculate the first part of the public key and to calculate, using a data identifying a first recipient, a first private key associated with the first recipient;
a second calculating unit configured to calculate, using the: data identifying the first recipient, a second part of the public key, so as to associate the public key with the first recipient;
an encoding unit configured to encode a first message using the first part and second part of the public key; and
a decoding unit configured to decode the encoded first message using the first private key.

10. The system as recited in claim 9 wherein the key distribution center is an Internet site.

11. The system as recited in claim 9 wherein the first calculating unit, the second calculating unit, the encoding unit and the decoding unit include respective computer-readable media having stored thereon respective computer-executable program steps operative to perform respective functions of the units.

12. The system as recited in claim 11 wherein the computer is a personal computer.

13. A method for encrypting a message from a sender to a plurality of receivers, the method comprising the steps of:
generating, using a calculation function, a private key for each of the plurality of receivers using an identifier that uniquely identifies each of the plurality of receivers;
generating, using the calculation function, a first part of a public key for each of the plurality of receivers, the first part of the public key being the same for all public keys;
generating, by the sender, a second pail of the public key for each of the plurality of receivers using the calculation function and the identifier that uniquely identifies each of the plurality of receivers; and
encrypting, by the sender, the message to each of the plurality of receivers using the first part and the second part of the public key of each of the plurality of receivers.

14. The method as recited in claim 13, further comprising the steps of:
providing the generated respective private key for each receiver to each of the plurality of receivers;
publishing the first part of the public key for each of the plurality of receivers;
obtaining, by the sender, the published first part of the public key;
transmitting the encrypted message to each of the plurality of receivers; and
decrypting, by each of the plurality of receivers, the encrypted message using the respective private key for each receiver.

* * * * *